US008542827B2

(12) United States Patent  
Razzell

(10) Patent No.: US 8,542,827 B2  
(45) Date of Patent: Sep. 24, 2013

(54) SHARED ENCRYPTION KEY GENERATION VIA ACCELEROMETER DIGITIZATION

(75) Inventor: Charles Razzell, Pleasanton, CA (US)

(73) Assignee: NXP B.V., Eindhoven (NL)

( * ) Notice: Subject to any disclaimer, the term of this patent is extended or adjusted under 35 U.S.C. 154(b) by 318 days.

(21) Appl. No.: 12/920,525

(22) PCT Filed: Mar. 5, 2009

(86) PCT No.: PCT/IB2009/050900  
§ 371 (c)(1),  
(2), (4) Date: Sep. 1, 2010

(87) PCT Pub. No.: WO2009/109930  
PCT Pub. Date: Sep. 11, 2009

(65) Prior Publication Data  
US 2011/0010551 A1    Jan. 13, 2011

Related U.S. Application Data

(60) Provisional application No. 61/068,325, filed on Mar. 5, 2008.

(51) Int. Cl.  
*G06F 21/00*    (2013.01)

(52) U.S. Cl.  
USPC ............. 380/46; 380/255; 380/259; 380/260; 380/277; 380/270; 380/44; 713/171; 713/168

(58) Field of Classification Search  
USPC ........................................ 713/171  
See application file for complete search history.

(56) References Cited

U.S. PATENT DOCUMENTS

| 4,314,251 A * | 2/1982 | Raab .............................. 342/463 |
| 6,993,399 B1 * | 1/2006 | Covell et al. .................... 700/94 |
| 7,149,555 B2 * | 12/2006 | Suda .............................. 455/574 |
| 7,907,901 B1 * | 3/2011 | Kahn et al. ................... 455/41.2 |
| 2009/0028262 A1 * | 1/2009 | Imai et al. ..................... 375/267 |
| 2009/0214028 A1 * | 8/2009 | Schneider ....................... 380/44 |

OTHER PUBLICATIONS

D. Bichler, G. Stromberg, M. Huemer and M. Lw, Key Generation Based on Acceleration Data of Shaking Processes, Proc. Int'l Conf. Ubiquitous Computing (UbiComp '07), pp. 304-317, 2007.*  
Holmquist, L. E., et al. "Smart—Its Friends: A Technique for Users to Easily Establish Connections Between Smart Artefacts,": Ubicomp 2001, pp. 116-112 (Sep. 2001).

(Continued)

*Primary Examiner* — Kambiz Zand  
*Assistant Examiner* — Imhoptep Durham

(57) ABSTRACT

An apparatus and method for generating a shared secret between at least two wireless portable electronic devices. A shared secret is generated by holding together the at least two devices and shaking them. An acceleration of the at least two devices is measured at least during a time window beginning at a time corresponding to when a magnitude of the acceleration exceeds a predetermined threshold. The acceleration is sampled, resulting in a plurality of vectors, such that a first vector is an initial sample of the acceleration during the time window. In some embodiments, the acceleration is measured in three dimensions. Dot products are calculated between the first vector and each of a plurality of subsequent vectors, resulting in an array of scalars. At least a portion of this array is used to generate the shared secret between the at least two devices.

19 Claims, 2 Drawing Sheets

(56) References Cited

OTHER PUBLICATIONS

Castelluccia, C. et al. "Shake Them Up! A Movement-based pairing protocol for CPU-constrained devices," Proc. 3$^{rd}$ Int'l. Conf. on Mobile Systems, Applications, and Services, pp. 51-64 (2005).

Bichler, D., et al. "Innovative Key Generation Approach to Encrypt Wireless Communication in Personal Area Networks," IEEE Global Telecommunications Conf. 2007, pp. 177-181 (Nov. 1, 2007).

Mayrhofer, R., et al. "Shake Well Before Use: Authentication Based on Accelerometer Data," Pervasive Computing; (Lecture Notes in Computer Science; LNCS), vol. 4480, pp. 144-161 (May 13, 2007).

International Search Report and Written Opinion for Int'l. Patent Appln. No. PCT/IB2009/050900 (Aug. 20, 2009).

\* cited by examiner

SHARED ENCRYPTION KEY GENERATION VIA ACCELEROMETER DIGITIZATION

Portable wireless devices enable nearly effortless communication, which is convenient but may present privacy and security issues. A common way to secure communication between devices is to encrypt messages. Encryption is currently employed, for example, in Wireless local area network (LAN) and Bluetooth (IEEE standard 802.15.1) connections, and will likely be used in ultra wide band (UWB) wireless personal area network (PAN) connections.

To enable encrypted communication, devices are associated (or paired). Association typically requires users to enter complex pass codes or serial numbers identically into all devices that should be allowed to participate. Examples include wireless encryption protocol (WEP) keys in wireless local area networks (WLAN), and personal identification numbers (PIN) for Bluetooth devices. These processes can be error-prone and cumbersome to the user, and may be a source of frustration if the code is too complex. Further, security may be compromised if the code is too short or set to a common default value, such as 1, 2, 3, 4, or if the code is intercepted by a third party.

Thus, there is a desire for a safe and facile method to enable secure communications between portable electronic devices.

An apparatus and method for generating a shared secret between at least two portable electronic devices. According to a first embodiment, a shared secret is generated by holding together the at least two devices and shaking them. An acceleration of the at least two devices is measured at least during a time window beginning at a time corresponding to when a magnitude of the acceleration exceeds a threshold. The acceleration is sampled, resulting in a plurality of vectors, such that a first vector is an initial sample of the acceleration during the time window. In some embodiments, the acceleration is measured in three dimensions.

Dot products are calculated between the first vector and each of a plurality of subsequent vectors, resulting in an array of scalars. At least a portion of this array is used to generate the shared secret between the at least two devices.

According to a further embodiment, the resolution of at least one of the array of scalars, or the plurality of vectors is reduced, to improve the repeatability and increase the probability that the at least two devices have the same shared secret. The array of scalars may be checked for compliance with some characteristic, such as entropy, randomness, or bounds on the run lengths of repeated numbers. The device may notify the user of success or failure of the check.

After generating the shared secret, some embodiments will set up a secure link between the at least two devices, and may send a confirmation datagram between the devices to ensure that secure communication has been established. The user may be notified of success or failure of the confirmation datagram, for example, by appropriately lighting an LED.

An exemplary embodiment of an apparatus according to the present invention includes a computation unit, an accelerometer, an analog to digital converter (ADC), which in some cases may be integral to the accelerometer package, and a wireless communications device. The computation unit includes a timer, memory, at least one communications port, and a central processing unit. The accelerometer may measure three dimensions of acceleration. The ADC is coupled between the accelerometer and the at least one communications port. The wireless communications device communicates with external devices. According to this embodiment, the computation unit is configured to generate a private key corresponding to the acceleration information. The private key may correspond to scalar products of an initial acceleration vector with each of a plurality of subsequent acceleration vectors.

The accompanying drawings, together with the specification, illustrate exemplary embodiments of the present invention, and, together with the description, serve to explain the principles of the present invention.

Figure 1:
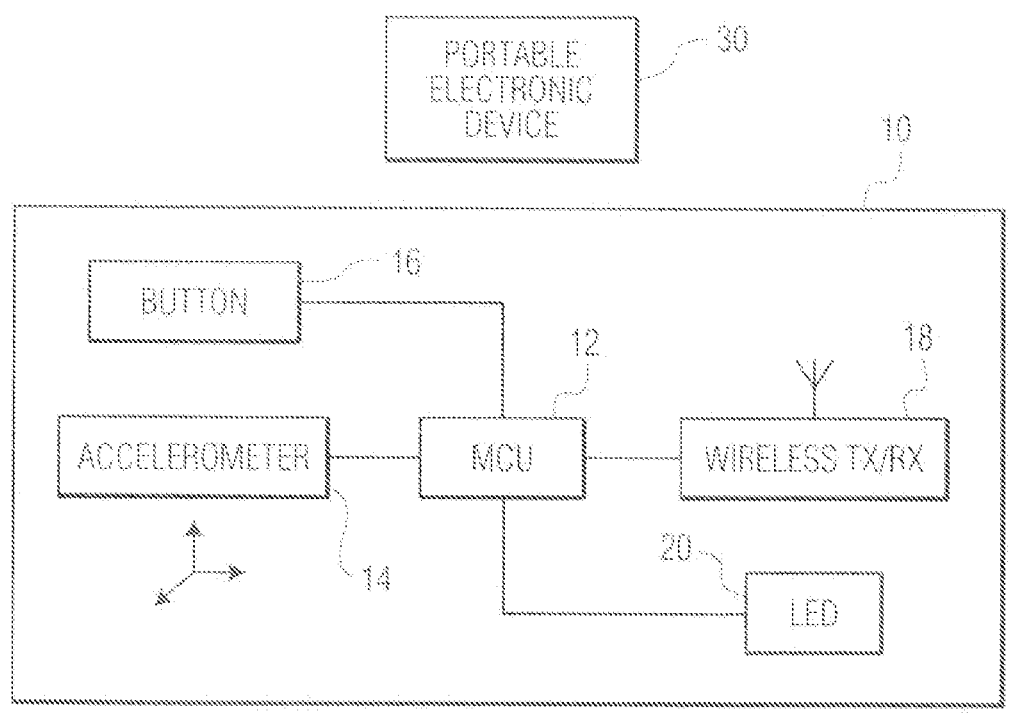
FIG. 1 is a block diagram illustrating an exemplary embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Also, in the context of the present application, when an element is referred to as being "connected" or "coupled" to another element, it can be directly connected or coupled to the another element or be indirectly coupled or connected to the another element with one or more intervening elements interposed therebetween. Like reference numerals designate like elements throughout the specification.

A feature of an exemplary embodiment is the use of 3D accelerometers embedded in portable devices. The devices are generally small enough that they can be held in one hand and shaken in a random pattern by the user. This shaking creates a 'shared unique experience' of the two devices, which is turned into a digitized numeric code known only to the two devices that were shaken together. Ease of use can be augmented by allowing for arbitrary relative orientation of the devices in three dimensions by using the direction of an initial acceleration event to exceed a predefined threshold in a given time window as a reference vector for all other digitized points. This solution reduces or eliminates the need for keyboard entry of potentially long character strings on small portable devices.

Embodiments of the present invention may be applied to any portable devices that are programmed with a shared secret for the purposes of association, pairing, or cryptography. Examples include unlicensed WLAN and WPAN devices using WiFi, Bluetooth or WiMedia technology. Implementation is highly visible due to the unique user interaction needed to initiate the operation described herein.

FIG. 1 is a block diagram illustrating an exemplary embodiment of the present invention including two portable electronic devices 10 and 30. For example, device 10 may be a cellular telephone, and device 30 may be a Bluetooth headset. According to this embodiment, portable electronic device 10 includes a microcontroller unit (MCU) 12, a three-dimensional (3D) accelerometer 14, a push button 16, a wireless transceiver 18, and a light emitting diode (LED) 20. Portable electronic device 30 has substantially the same features and functions as the device 10 for establishment of a shared secret through accelerometer digitization.

In alternative embodiments, the MCU 12 may be replaced with, or work alongside, a state machine or a programmable logic device, or any other control device known in the art. The accelerometer 14 and the push button 16 provide information to the MCU 12. The MCU 12 drives the LED 20 and sends appropriate control information to the wireless transceiver 18 to communicate with external devices.

In various embodiments, the wireless transceiver 18 may use essentially any wireless RF protocol, or may be an infrared transceiver, or another device for wireless communications. Alternative embodiments may replace the wireless block 18 with a wired port, such as, for example, a plug that fastens two portable devices 10 and 30 together while providing a communications interface.

According to this embodiment, the LED 20 functions to notify a user that a successful pairing has occurred. Alternative embodiments may notify the user by other means, such as an audible acknowledgment, a text display, or a vibration. Another embodiment may provide no notification at all.

Various embodiments of the 3D accelerometer 14 may include a single 3D sensor, or may be a suitably arranged group of three one-dimensional sensors, or a similar arrangement using a two-dimensional and a one-dimensional sensor. Accelerometer 14 may be a microelectromechanical system (MEMS) sensor, a piezoelectric device, or any other of the many forms of accelerometers known in the art.

According to one exemplary embodiment, the accelerometer 14 includes an embedded analog to digital converter (ADC), and outputs digital data using, for example, a serial communications interface. In another exemplary embodiment, an ADC is embedded in the MCU 12, and converts analog acceleration data to digital form for use by the MCU 12. In yet another exemplary embodiment, the ADC is a separate block between the accelerometer 14 and the MCU 12. In any case, the accelerometer 14 senses the acceleration of the portable device 10 in three dimensions, and communicates data representing the acceleration, in digital form, to the MCU 12. The acceleration data may not necessarily be directly proportional to the actual acceleration of the device.

The digital acceleration data may be of essentially any resolution, but for the purpose of illustration it will be assumed that the acceleration data is quantized and represented by 8 bits for each dimension of acceleration. According to some embodiments, repeatability may be improved with a coarser quantization, for example, using only three or four bits.

In order to facilitate secure pairing of two devices 10, both devices should have the same encryption key. Using the acceleration of the devices to generate the key, according to an exemplary embodiment, a user holds the two devices together and shakes them in a random pattern. In this way, both devices have a shared unique experience, and thus, they can have the same key based on the acceleration. Further, because the key itself is not necessarily sent between the two devices, and the user does not even necessarily know the key, it is more difficult for a third party to compromise the secure link.

Two issues should be overcome for an embodiment to successfully pair the two devices 10. First, a common time and orientation reference should be found. Both devices have to select an essentially identical time window to perform digitization, and both devices should agree on the 3D frame of reference for digitization. Second, measures should be taken to reduce the variability of the output of the accelerometers 14 to below the quantization noise floor of the digitization, or to selectively correct for errors resulting from differences in the calibration of accelerometers 14 (e.g., differences in sensitivity, offset, or nonlinearity of the sensor outputs).

Figure 2:
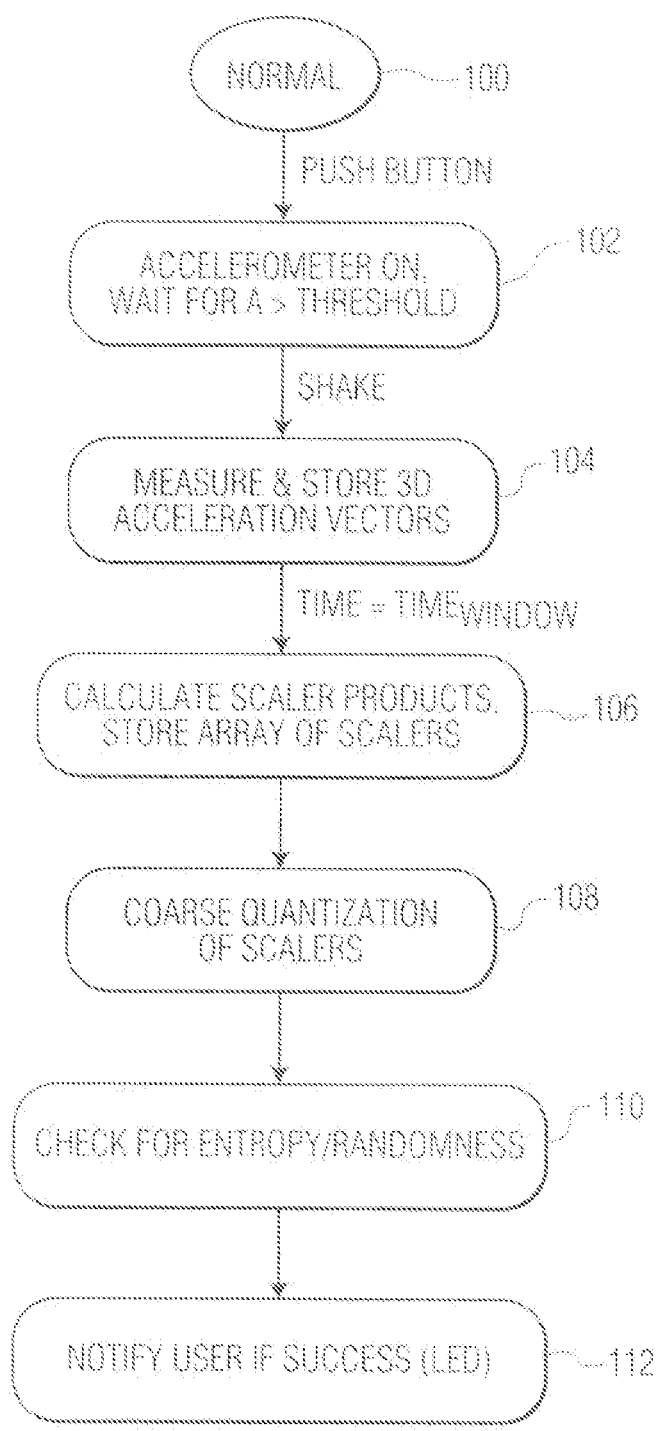
FIG. 2 is a flow chart illustrating the operation of an exemplary embodiment of the present invention.

FIG. 2 is a flow chart illustrating exemplary steps of generating a secure communications link using the device illustrated in FIG. 1. According to this method, the device 10 begins the establishment of a secure link when a user pushes the button 16 while the device 10 is in a normal operation mode 100. This action informs the device 10 that the user wishes to associate the device 10 with another device 30. In response, the MCU 12 turns on the accelerometer 14 and begins reading the data coming from it.

According to an exemplary embodiment, during the 'willing to associate' state of block 102, the 3D accelerometer 14 repeatedly samples three dimensions of acceleration at a sampling interval $t_{samp}$. The accelerometer 14 accordingly sends three 8-bit numbers each $t_{samp}$ to the MCU 12, representing three Cartesian coordinates of a 3D acceleration vector in the x, y, and z directions. According to this exemplary embodiment, MCU 12 waits for an acceleration event greater than some threshold acceleration (102). To accomplish this, the MCU 12 may calculate the magnitude of each 3D acceleration vector and compare the calculated magnitude to the stored threshold acceleration. When an acceleration event is detected that is greater than the threshold, the measurement window begins, and the MCU 12 stores an array of 3D acceleration vectors in memory (104). The MCU 12 continues to store vectors until the measurement window expires.

According to an alternative embodiment, instead of calculating the magnitude of 3D acceleration vectors, the threshold may correspond to any one of the three dimensions, such that the time window begins when an acceleration event in one particular direction is greater than the threshold. In yet another exemplary embodiment, another device, such as spring-and-mass system, a piezoelectric sensor, or any other suitable or similar device may be used to detect the initial threshold acceleration event. One of ordinary skill in the art will see that other related possibilities exist that are still within the spirit and scope of this invention.

It is desired that synchronization between the two devices 10 can be achieved with arbitrary orientation of each device 10 relative to the other. For example, one device 10 may be upside-down relative to the other, or at some intermediate angle. In such a case, the 3D accelerometer 12 in a first device 10 would output vectors representing a shaking motion that point in a different direction than a second device 10 held in a different orientation.

According to an exemplary embodiment, to address this issue, a dot product (or a scalar product) is taken between an initial vector, representing a first acceleration event, and subsequent vectors in the measurement window (106). Because both devices will use their respective initial acceleration vector, representing the acceleration event greater than the threshold, due to the nature of the dot product, this will achieve orientation independence.

The dot product of two vectors results in a scalar, equal to the product of the magnitudes of the two vectors, and the cosine of the angle between them. That is, $\vec{a} \cdot \vec{b} = |\vec{a}| \times |\vec{b}| \times \cos \theta$, where $\vec{a}$ represents a vector, $|\vec{a}|$ represents the magnitude or length of the vector, and $\theta$ represents the angle between the two vectors. The MCU 12 may calculate the dot product between two 3D vectors as follows, resulting in the same scalar as above. If $\vec{a} = a_x \vec{i} + a_y \vec{j} + a_z \vec{k}$, and $\vec{b} = b_x \vec{i} + b_y \vec{j} + b_z \vec{k}$, where $\vec{i}$, $\vec{j}$, and $\vec{k}$ are unit vectors in the x, y, and z directions, respectively, then $\vec{a} \cdot \vec{b} = a_x b_x + a_y b_y + a_z b_z$.

To achieve synchronization between the two devices 10, according to an exemplary embodiment, the measurement window may begin with the first sample with a magnitude greater than a threshold. In alternative embodiments, the initial sample is not necessarily the first sample after the threshold acceleration event, but generally the initial sample should be a sample measured at a time corresponding to the acceleration event that exceeds the threshold.

In addition to achieving synchronization, using the initial sample also achieves orientation independence. Taking the dot product of each subsequent vector with the initial vector results in an array of scalars, which should be the same for two devices that have a shared acceleration experience, independent of their relative orientation.

Referring back to FIG. 2, once the matrix of acceleration measurements over the sampling window is stored in memory, according to this embodiment, the MCU 12 calculates the dot product of the initial vector with each of the subsequent vectors, and stores the resultant scalars in memory (106).

As mentioned above, a coarse quantization of numbers (108) may improve repeatability, such that the two devices 10 are more likely to result in the same key after having the shared experience. Above, the exemplary embodiment stored 8-bit values for each of the three dimensions of acceleration. As illustrated in FIG. 2, a further embodiment reduces the resolution of the scalars previously calculated.

Systematic error correction code syndromes may optionally be exchanged between devices 10 and 30 to allow correction and verification of shared secret code words. For example, a Reed-Solomon code corresponding to the locally generated sequence may be transmitted to the link partner with which a secure connection is desired. The receiving device may then use this syndrome to correct one or more acceleration samples that may have been digitized with a slightly different value due to imperfect calibration and matching of the different accelerometers. A protocol may define which device 10, 30 will be assumed to have the 'correct' version of the shared secret, which will assume the need to attempt error correction on its locally generated version of the same random acceleration event. The design of the error correcting code should be carefully optimized to provide just enough error correction capability to ensure reliable pairing, but at the same time reducing the possibility of deducing the shared secret from the error syndromes alone.

Following calculation of the scalars, the optional coarse quantization, and the optional error correction, the MCU 12 next checks the data to ensure that there is sufficient entropy or randomness in the random sequence (110). This may simply involve checking bounds on the run lengths of repeated digits, or it may employ more sophisticated calculations depending on the needs and resources of a particular embodiment. At least a portion of the resultant array of scalars, which should be the same in each device 10, is used as the key used for creating the secure communications link.

If the data collected during the time window includes an acceleration event that exceeds the magnitude needed to trigger collection, and the resultant data meets the selected randomness criteria, according to an exemplary embodiment, positive feedback is sent to the user using the LED 20 (112). For example, different color LEDs, an LCD display, or any other suitable display, vibration, and/or audible signal may be used. Otherwise, the user is requested to try again.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The invention claimed is:

1. A method performed by a device for generating a shared secret between the device and at least one additional device, the method comprising:
    measuring an acceleration of the device at least during a time window beginning at a time corresponding to when a magnitude of the acceleration exceeds a threshold;
    sampling the acceleration to generate a plurality of vectors, a first vector among the plurality of vectors being an initial sample of the acceleration during the time window;
    calculating dot products between the first vector and each of subsequent vectors among the plurality of vectors, resulting in an array of scalars;
    reducing a resolution of at least one of the array of scalars or the plurality of vectors; and
    utilizing at least a portion of the array of scalars to generate the shared secret.

2. The method according to claim 1, further comprising checking the array of scalars for a compliance with a characteristic.

3. The method according to claim 2, further comprising notifying a user of a status of the compliance with the characteristic.

4. The method according to claim 1, wherein said measuring the acceleration comprises measuring the acceleration in three dimensions.

5. The method according to claim 1, further comprising: setting up a secure link between the at least two devices; and sending a confirmation datagram between the at least two devices.

6. The method according to claim 5, further comprising notifying a user of a success or a failure of the confirmation datagram.

7. The method according to claim 1, further comprising: calculating error correction syndromes corresponding to the array of scalars calculated in at least one of the devices; transmitting the error correction syndromes between the at least two devices; and utilizing the error correction syndromes to correct an error of at least one locally generated scalar relative to scalars generated by the other of the at least two devices.

8. An apparatus comprising:
    a computation unit comprising a timer, a memory, at least one communications port, and a central processing unit;
    a three-dimensional accelerometer for measuring acceleration information during a time window beginning at a time corresponding to when a magnitude of acceleration exceeds a threshold; and
    a wireless communications device coupled to the computation unit,
    wherein the computation unit is configured to:
        generate a reduced resolution array by coarsely quantizing scalar products,
        generate a private key corresponding to the acceleration information.

9. The apparatus according to claim 8, wherein the scalar products are generated based on an initial acceleration vector and each of a plurality of subsequent acceleration vectors.

10. The apparatus according to claim 9, wherein the private key corresponds to said reduced resolution array.

11. The apparatus according to claim 9, wherein the computation unit is further configured to check said scalar products for compliance with a reference characteristic.

12. The apparatus according to claim 9, wherein the computation unit is further adapted to calculate error correction syndromes corresponding to the scalar products, and wherein errors in acceleration data are corrected utilizing the error correction syndromes.

13. An apparatus comprising:
    a computation unit comprising a timer, a memory, at least one communications port, and a central processing unit;
    an accelerometer for measuring acceleration information; and
    a wireless communications device coupled to the computation unit, wherein the computation unit is configured to:
- calculate scalar products of an initial acceleration vector and a plurality of subsequent acceleration vectors,
- generate a reduced resolution array by coarsely quantizing the scalar products, and
- generate a private key corresponding to the reduced resolution array.

14. The apparatus according to claim 13, wherein the accelerometer comprises a three-dimensional accelerometer.

15. The apparatus according to claim 13, wherein the computation unit is further configured to check said scalar products for compliance with a reference characteristic.

16. The apparatus according to claim 13, wherein the computation unit is further adapted to calculate error correction syndromes corresponding to the scalar products, and wherein errors in acceleration data are corrected utilizing the error correction syndromes.

17. The method according to claim 1, wherein reducing the resolution of at least one of the array of scalars or the plurality of vectors comprises using only a subset of bits representing at least one of: a scalar of the array of scalars and a vector of the plurality of vectors.

18. The apparatus according to claim 10, wherein coarsely quantizing the scalar products comprises generating a reduced resolution value for a scalar product of the scalar products by utilizing only a subset of bits representing the scalar product.

19. The apparatus according to claim 13, wherein coarsely quantizing the scalar products comprises generating a reduced resolution value for a scalar product of the scalar products by utilizing only a subset of bits representing the scalar product.

* * * * *